(12) United States Patent
Stiefenhofer (10) Patent No.: US 10,116,460 B2
(45) Date of Patent: Oct. 30, 2018

(54) REMOTE BATTERY MANAGEMENT SYSTEM, MANAGEMENT DEVICE, AND REMOTE BATTERY MANAGEMENT METHOD

(71) Applicant: Sonnen GmbH, Wildpoldsried (DE)

(72) Inventor: Torsten Stiefenhofer, Wildpoldsried (DE)

(73) Assignee: Sonnen GmbH, Wildpoldsried (DE)

( * ) Notice: Subject to any disclaimer, the term of this patent is extended or adjusted under 35 U.S.C. 154(b) by 379 days.

(21) Appl. No.: 14/729,697

(22) Filed: Jun. 3, 2015

(65) Prior Publication Data

US 2016/0357165 A1    Dec. 8, 2016

(51) Int. Cl.
| | |
|---|---|
| *H04L 12/28* | (2006.01) |
| *G06Q 50/06* | (2012.01) |
| *G05F 1/66* | (2006.01) |
| *G06Q 30/02* | (2012.01) |
| *H02J 3/38* | (2006.01) |
| *H02J 7/00* | (2006.01) |
| *H02J 3/32* | (2006.01) |
| *G05B 19/042* | (2006.01) |

(52) U.S. Cl.
CPC ........ *H04L 12/2818* (2013.01); *G05B 19/042* (2013.01); *G05F 1/66* (2013.01); *G06Q 30/0202* (2013.01); *G06Q 50/06* (2013.01); *H02J 3/32* (2013.01); *H02J 3/382* (2013.01); *H02J 7/0021* (2013.01); *H04L 12/2825* (2013.01); *G05B 2219/2639* (2013.01); *Y02B 70/325* (2013.01); *Y02B 70/3216* (2013.01); *Y02B 70/3258* (2013.01); *Y02B 90/228* (2013.01); *Y02E 10/763* (2013.01); *Y02E 10/766* (2013.01); *Y02E 40/70* (2013.01); *Y04S 10/123* (2013.01); *Y04S 20/227* (2013.01)

(58) Field of Classification Search
CPC .. H02J 3/14; H02J 3/382; H02J 7/0021; H02J 7/0068; H02J 7/34; H04L 12/2803; H04L 12/2818; H04L 12/2825; H04L 67/10; H04L 67/125; G06Q 10/06315; G06Q 30/0202; G06Q 50/06; Y04S 10/1232; Y04S 20/222; Y04S 20/224; Y04S 20/228; Y04S 20/242; Y02B 70/3225; Y02B 70/325; Y02B 70/3266; Y02B 90/222; Y02E 10/763; Y02E 40/72; G05F 1/66; G05B 11/01; Y10T 307/406; Y10T 307/516

See application file for complete search history.

(56) References Cited

U.S. PATENT DOCUMENTS 8,571,720 B2 * 10/2013 Yonezawa ................. H02J 3/14 700/291
8,947,066 B2 * 2/2015 Terashima ................. H02J 3/14 323/299

(Continued)

FOREIGN PATENT DOCUMENTS

| EP | 2680389 A1 | 1/2014 |
|---|---|---|
| WO | 2007104167 A1 | 9/2007 |

*Primary Examiner* — Crystal J Barnes-Bullock
(74) *Attorney, Agent, or Firm* — Sughrue Mion, PLLC (57) ABSTRACT

An a remote battery management system, a management device for such a system and a remote battery management method are provided, with which a demand for electrical power of an external power grid is identified and then met with the help of a battery system connected to that power grid.

22 Claims, 3 Drawing Sheets

(56) References Cited

U.S. PATENT DOCUMENTS

| | | | | |
|---|---|---|---|---|
| 9,002,761 | B2* | 4/2015 | Montalvo | G06Q 10/06 |
| | | | | 322/38 |
| 9,379,545 | B2* | 6/2016 | Daniel | H02J 1/14 |
| 9,411,356 | B2* | 8/2016 | Han | G05F 5/00 |
| 2010/0191585 | A1* | 7/2010 | Smith | B60L 11/1816 |
| | | | | 705/13 |
| 2012/0043819 | A1 | 2/2012 | Kang et al. | |
| 2012/0065805 | A1* | 3/2012 | Montalvo | G06Q 10/06 |
| | | | | 700/297 |
| 2013/0015713 | A1* | 1/2013 | Hagihara | H02J 3/32 |
| | | | | 307/72 |
| 2013/0151021 | A1* | 6/2013 | Kim | H02J 3/005 |
| | | | | 700/286 |
| 2014/0074310 | A1* | 3/2014 | Kim | G06F 1/3234 |
| | | | | 700/297 |
| 2014/0210267 | A1* | 7/2014 | Ishida | H02J 7/0021 |
| | | | | 307/31 |
| 2014/0248802 | A1* | 9/2014 | Hieda | H04L 12/2818 |
| | | | | 439/620.01 |
| 2015/0066231 | A1* | 3/2015 | Clifton | H02J 7/0068 |
| | | | | 700/296 |
| 2015/0073614 | A1* | 3/2015 | Yoshida | H02J 3/14 |
| | | | | 700/295 |
| 2015/0127185 | A1* | 5/2015 | Behrangrad | G05B 15/02 |
| | | | | 700/297 |
| 2016/0125339 | A1* | 5/2016 | Itaya | G06Q 50/06 |
| | | | | 705/7.25 |
| 2016/0197474 | A1* | 7/2016 | Aisu | H02J 3/14 |
| | | | | 700/297 |
| 2017/0070089 | A1* | 3/2017 | Fukubayashi | H02J 13/0079 |
| 2017/0133866 | A1* | 5/2017 | Itoh | H02J 7/0021 |

* cited by examiner

REMOTE BATTERY MANAGEMENT SYSTEM, MANAGEMENT DEVICE, AND REMOTE BATTERY MANAGEMENT METHOD

FIELD OF THE INVENTION

The invention relates to a remote battery management system, a management device for such a system and a remote battery management method.

BACKGROUND OF THE INVENTION

Whenever the sum of all electrical power supplied to an electrical power grid by energy suppliers falls short of the sum of all electrical power extracted from the grid by customers, there is a danger that the grid supply becomes unstable and eventually breaks down. An overabundance of power supplied to the grid may also be detrimental, because it may cause electrical parameters, such as the grid voltage or the frequency to change. The amount of power supplied to the grid may vary depending on the season, and also depending on the time of day. For example, energy generators producing renewable energy, such as wind or solar farms, may produce much lower power levels during certain seasons or during certain times of day. On the other hand, there is also the variance in the demand of electrical power from the grid by the consumers, also depending on the season as well as on the time day. For example, power hungry air-conditioners may be utilized mainly during hot summer months.

In order to be able to ensure a stable supply of power to all customers, the provider of an electrical power grid will have to install some sort of power management. This includes long-term management in order to anticipate seasonal changes in the supply and demand of electrical power, and short-term management, which reacts to changes in supply and demand in a matter of hours, minutes, or even seconds.

One approach for such management is to control the loads connected to the grid. This is called load management or demand side management (DSM). In this case, customers of the grid relegate some of their command over their power consuming appliances and systems to the management system, which can decide on the amount of power consumed by each appliance at a certain time, within predefined decision making boundaries. For example, a customer may program an appliance, such as a washing machine, to start a process any time during a certain day or during a certain time period. The management system may then be given permission to control the exact time when the appliance starts that process within that day or time period, depending on when the grid can supply the necessary electrical power to the appliance. The appliance can even be used by the management system to syphon off excess electrical power from the grid when necessary.

On the other hand, power station management or supply side management may be employed. In this case, instead of controlling the loads, the management system will regulate the output provided by the power stations supplying the power to the grid, in order to avoid a power shortage on the grid. In particular, the management system might decide to turn on a power plant using a conventional fossil fuel based energy source at times when renewable energy sources are not able to supply enough power to the grid.

The arrival and rise of renewable energy sources has lead to a certain degree of decentralization of the energy market. One of the incentives for this decentralization is the possibility to sell electrical power generated by small renewable energy sources to the grid power provider. Specifically, a customer of the electrical grid, i.e. anyone who is running appliances with electrical power from the grid, may install a solar panel next to his or her building. The solar panel will provide electrical energy to the appliances of the customer, leading to reduced electrical bills. When the solar panel does not produce enough energy to run all the appliances, the customer might choose to either reduce the number of loads on his side, or to use more electrical power from the grid in order to satisfy his energy needs.

Often, the customer installing and operating such a local power source or local power generator, will also install a battery system nearby, which will store any excess energy coming from the local power generator during peak production times, such as on windy hours for a wind turbine or during especially sunny periods for solar panels, which the appliances cannot absorb at that time. Instead, this stored energy can be used at a later time, when there is not enough power being generated by the local power source to supply to the appliances. In addition, when there is no excess power to charge it, such a battery system may also be charged with electrical power coming from the external grid.

Besides selling the power generated by his local power generator directly to the grid power provider, the customer can sell some of the electrical energy stored in the battery system to the grid power provider. However, since the customer usually does not know the status of the grid at any given time, he will not know when would be an ideal time to supply the electrical power from the battery system to the external grid.

It is therefore one objective of the present invention to provide devices and methods for managing a battery system installed at a building of a customer and connected to an external power grid, in such a way as to efficiently and safely supply electrical power to the external power grid.

SUMMARY OF THE INVENTION

In order to achieve the above-mentioned objective, according to one aspect of the invention, a remote battery management system is provided. Said system comprises at least one battery system, which is installed at a building of a customer, either inside the building or outside near the building. The building can be a private home, an apartment building, or a commercial building such as a factory. Said battery system is connected to an external power grid, which may in particular be a power grid of a town, of a city or of a county, which is owned by a grid provider. The external grid is responsible for distributing electrical power coming from at least one power generator, such as a conventional or regenerative power plant, to households and commercial customers via grid lines.

The battery system is configured to store excess electrical power. This excess power may be electrical power supplied through said external power grid, i.e. electrical power that is supplied to the customer, but not needed or utilized by the appliances or loads at the building at a certain time. Any such electrical power exceeding or surpassing the power needed to run the customer's appliances, which is supplied through the external grid, may be regarded as excess electrical power. Advantageously, the battery system is designed to be charged through the external power grid whenever the opportunity arises, in order to be prepared for any shortage of power situation. Additionally, or alternatively, the battery system may be configured to store excess electrical power supplied by a local power generator. Said local power generator is a power generator installed inside, at or near said building. It may be a backup power devise for providing electrical power to the appliances in or about the building during a power shortage. The local power generator may be a regenerative energy source or an alternative energy source such as a wind turbine or a solar panel, and/or it may comprise a conventional source of backup electrical power such as a backup power generator driven by a gasoline engine or a gas turbine.

The electrical power generated by the local power generator may be fed into the external power grid, in which case the customer may receive a monetary compensation for the amount of energy fed into the grid. Crucially, said battery system is also configured to supply the stored electrical power to said external power grid when needed or desired. In other words, said battery system may store the electrical power from the external grid and feed it back to the grid at a later time.

According to one aspect of the invention, first a demand for electrical power is identified. This demand may be a demand by the external power grid. There might be an imbalance between the power supplied to the power grid and the power drawn out of the grid by the various loads connected to it. In this case, the discrepancy between the supplied power and the power drawn out may be defined as the demand for power. The demand can, however, be a projected demand in cases where there is a prognosis of such power imbalance in the grid. Instead of or in addition to identifying a demand for power of the entire grid, the demand that is identified may be by a specific load connected to the external grid. This load may be an appliance of a second customer of the grid power provider.

Once said demand is identified, an inquiry is transmitted to an electronic input module of the customer. The input module is a device which accepts an input of the customer and sends an appropriate response signal to the management device. It may be a personal computer (PC), or a mobile device such as a tablet, a cell phone, a smart phone or the like. The inquiry may e.g. be a text message to the customer's cell phone. The inquiry may be exchanged between the management device and the input module with the help of an App installed on the customer's input module as part of an in-App message. In a preferred embodiment, the inquiry contains a request for electric power service, and the customer may send an affirmative answer as a response to the inquiry. By sending such an affirmative response, the customer agrees to allow his or her battery system to be used remotely to supply the electrical power demanded by the grid or the load.

It should be noted that the expression "electrical power service" may refer to positive power supplied to the grid or the load, i.e. power stored in the battery system being supplied to the external grid to offset a shortage. It may, however, also refer to negative power, i.e. excess capacity inside the battery system provided to the external grid or load such that excess power may be sent to the battery system from the external grid or load. The battery system may therefore be utilized by the external grid or by the load to balance or compensate for any imbalances in the grid power by supplying missing power and/or removing excess power, in order to allow for an efficient and reliable operation of the grid.

According to an important aspect of the invention, the above described steps of a remote battery management method are performed in the remote battery management system by a management device. The management device may be installed at a site of a power grid provider, which may provide the power that is distributed to the customer's appliances through the external grid. Alternatively or in addition, the power grid provider may be a provider of the power grid itself, which is utilized to distribute power to the customer's appliances.

Said management device comprises a microprocessor and memory. Furthermore, it is configured to perform the necessary steps of a remote battery management method described herein. The steps of said method may be implemented in software code inside the memory of the management device to be performed by the microprocessor. The software may be installed in the memory of the management device permanently or it may be located on a storage medium such as a compact disc or a flash drive and transferred into the memory of the management device upon installation or updating of the management device. Said management device advantageously comprises a computer system located at a site of the grid power provider and connected to the internet.

The battery system of the present remote battery management system is advantageously configured to be able to supply major appliances of a building with electrical power, such as a heating, ventilation and/or air conditioning system. In an advantageous embodiment, it may store at least 1 kWh (kilowatt hour) of electrical energy. More advantageously, it is configured to store at least 2 kWh, 5 kWh, 10 kWh or more of electrical energy. In particular, the battery system may be configured to store solar power from a solar panel installation or wind power from one or more wind turbines.

In an advantageous embodiment, the management method and correspondingly the management device and the management system may be further designed to allow the installation and management of further battery systems connected to said external power grid. In particular, a further inquiry requesting electric power service may be transmitted to a further electronic input module of a further customer. The customer and the further customer are a first customer and a second customer, who may have similar systems installed at their respective buildings. If operating the battery system of the first customer to supply electrical power to said external power grid is not sufficient to meet the identified demand for electrical power, the second customer is asked to allow the utilization of his or her battery system for better meeting that demand. Alternatively, the inquiry is transmitted to both customers' input modules, and the further battery system is operated to supply electrical power to said external power grid only if operating said battery system is not sufficient to meet said demand for electrical power. In yet a different embodiment, upon receipt of affirmative responses from both customers, both battery systems are operated such that each of them supplies part of the power demanded by the grid or the load.

The inquiry may contain information such as the demanded power or energy and the time and duration this power is requested. Furthermore, it may contain information regarding the compensation, which the customer may receive for responding to the request in the affirmative. The inquiry may in this case function as an offer to the customer. The management system may thus implement a sort of an auction by sending inquiries to different customers and, once the equivalent of the necessary amount of power is collected in terms of the customer responses, disregard any further affirmative responses, which would then be deemed to come too late. In other words, the management device would advantageously be configured to disregard said affirmative response from said electronic input module after receiving said further affirmative response from said further electronic input module and determining that said demand for electrical power has been met by operating said further battery system alone.

Instead of having to review each inquiry and to respond it, the customer may have the option of setting lower and/or upper limits on the compensation, for which he is willing to accept a request. In this case, the management device may be programmed to store such limits sent by the input module of the customer and refrain from sending the inquiry, if the calculated compensation lies within the limits set by the customer. Alternatively, the input module of the customer may be programmed to receive the inquiry and automatically send an affirmative response, if the compensation information included in the inquiry lies within the limits set by the customer. The lower and/or upper limits may be accompanied by an expiration time. Once such an expiration time has passed, the limits are no longer valid and may be automatically deleted. Or the management device or alternatively the input module may be configured to disregard the set limits after said expiration time has lapsed. With this preferred embodiment, the response times may be decreased significantly, which may be important for being able to quickly respond to electrical power needs of the power grid.

In a further preferred embodiment, said management device is further configured to disregard said affirmative response from said electronic input module after a lapse of a predetermined amount of time. This amount of time may be sent along with the inquiry to the input module as a deadline for accepting the offer. Advantageously, once the predetermined amount of time has lapsed, a further inquiry or updated inquiry or offer may be transmitted to the input module to give the customer a further chance of sending an affirmative response. The further inquiry may contain a higher price in order to offer a persuasive reason for responding in the affirmative. Alternatively, it may contain a lower price in order to establish an awareness of the customer that the compensation is higher if the offer is accepted earlier. Other forms of calculating a viable compensation may be employed. For example, the compensation may be based on the market price for electrical power, on the behavior of the customer and/or of many customers, information on which is collected from previous auctions, etc.

Advantageously, the management device is connected to the at least one battery system via a wire connection, e.g. through a local area network (LAN) or ethernet connection, in particular through the internet. Connections via glass fibers also fall under this embodiment. Alternatively, the connection between the management device and the at least one battery system may be a wireless connection, such as a wireless local area network (wireless LAN), Bluetooth, satellite communication or the like.

The management device is advantageously configured to identify a current demand for electrical power of said external power grid or of a load connected to said external power grid. In other words, it is identified in real time whether the grid is in need of electrical power from the battery system. Such a current demand may need immediate attention, for example in time ranges in the order of seconds, if otherwise the consequences would be severe for the maintenance of a reliable operation of the grid. Alternatively, the current demand may need to be addressed in a near future, for example within time ranges in the order of minutes or hours. As an alternative to or concomitantly to the identification of a current demand, a future demand may be identified by the management device. This future demand of the power grid may include a purported or projected demand for electrical power within a time frame in the order of hours or days. This future demand may be calculated on the basis of previously acquired data on the demand of electrical power, which may be analyzed with respect to a time of day, time of year, changes in voltage and/or frequency, or with respect to the variation or gradient of such parameters over time. An adaptive system may be utilized for identifying the future demand.

The management device may advantageously be configured to identify both current and/or future demand for electrical power by analyzing past delivery of electrical energy to the external power grid and past withdrawal of electrical energy from the external power grid. Also in this case, adaptive systems may be utilized to aid the identification process.

According to a preferred embodiment, said management device is configured to identify said demand for electrical power by monitoring an electrical parameter at said external power grid or at said load. Said electrical parameter may be a voltage value, a change of a voltage value, a frequency value, or a change of a frequency value at said external power grid or at said load. For this purpose, the parameter or parameters may be stored in a memory of the management device. They can then be retrieved by the microprocessor and analyzed, or they may be analyzed in real time by the microprocessor, with the help of appropriate algorithms for identifying current or future demands.

Said electrical parameter may be monitored by utilizing one or more appropriate sensors connected to said external power grid and/or to said load. The sensor, for example a voltage sensor, monitors said electrical parameter and is connected to said management device in order to be able to transmit the data to it.

The battery system may advantageously comprise a battery and a power inverter, which are configured to convert direct current (DC) power from the battery to alternative current (AC) power for supplying to the external power grid. Said battery and/or said power inverter may be configured to support a partitioning of the energy or power that they can provide.

In the case of a partitioning of the battery, this means that the storage capacity of the battery may be divided into sections. One first capacity section may be reserved exclusively for local use by an appliance of the customer, i.e. by an appliance installed at the same building as the battery system, while a second capacity section may be released for supplying electrical power to said external power grid. A third and/or fourth capacity section may be blocked altogether in order to ensure a safe and reliable operation of the battery in an optimum capacity region. Such third and fourth capacity sections may be set near the lowest and highest capacitance values, respectively.

Just as an example, said first capacity section for exclusive local use may be set between battery charge values of 10% and 50%, while said second capacity section for use by the external power grid may set between battery charge values of 50% and 95%. In this case, the charging values below 10% (third capacity section) and above 95% (fourth capacity value) may be off-limits for both local and external use. In other words, said battery system is configured to prevent the battery from reaching a charge value below 10% or above 95%.

In the case of a partitioning of the power inverter, similar provisions as explained above with respect to the storage capacity of the battery may apply for the power levels of the power inverter. A power inverter is usually configured for a maximum power level. I.e., it can supply power at its output only up to said maximum power level. Partitioning of the power inverter means that the output power level of the power inverter may be divided into sections. One first power level section may be reserved exclusively for local use by an appliance of the customer, i.e. by an appliance installed at the same building as the battery system, while a second power level section may be released for supplying electrical power to said external power grid. A third and/or fourth power level section may be blocked altogether in order to ensure a safe and reliable operation of the power inverter in an optimum power output region. Such third and fourth power level sections may be set near the lowest and highest power level values, respectively.

Just as an example, said first power level section for exclusive local use may be set between power inverter output levels of 10% and 50% of the maximum output level, while said second power level section for use by the external power grid may set between power level values of 50% and 95% of the maximum output level. In this case, the power level values below 10% of the maximum (third power level section) and above 95% of the maximum (fourth power level value) may be off-limits for both local and external use.

BRIEF DESCRIPTION OF THE DRAWINGS

The present invention will be explained in more detail in the following text with reference to preferred embodiments of a remote battery management system according to the invention, illustrated in FIG. 1 through FIG. 2, and of a remote battery management method, illustrated in FIG. 3, all of which are not intended to be restrictive.

DETAILED DESCRIPTION

Figure 1:
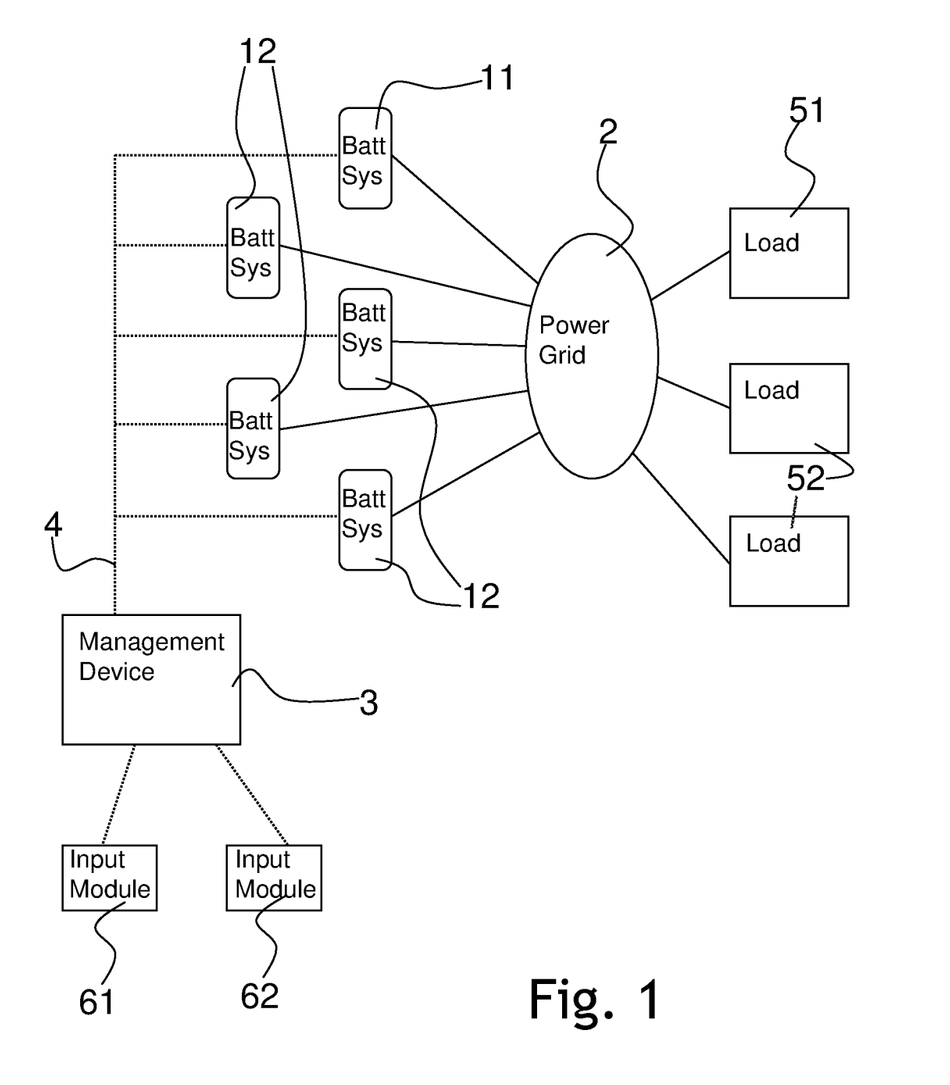
FIG. 1 is a schematic diagram of a remote battery management system according to one advantageous embodiment.

FIG. 1 shows a schematic diagram of a remote battery management system according to one advantageous embodiment. It shows a number of (in this case five) battery systems 11, 12, which may be installed at different buildings of different customers to a grid power provider, such as a local, regional or national electric power company. All battery systems 11, 12 are connected to an external power grid 2. As an example, the battery system 11 is connected to the external power grid 2 and configured to be charged and discharged through the grid 2. On the other hand, the grid 2 provides electrical power to a number of loads 51, 52. In FIG. 1, a load 51 and two further loads 52 are shown as way of an example. However, the number of loads connected to the power grid 2 may surpass several hundred or even several thousand loads, each of which may be an appliance or a group of appliances at various sites. In this case, the loads 51, 52 are highlighted, because the present system may be configured to identify and then manage a demand for electrical power from either the power grid 2, or one of the loads 51, 52. In particular, the system may be configured to handle a demand in the same way, independent of whether it originates from the power grid 2, or from one of the loads 51, 52.

The battery systems 11, 12 are connected to a management device 3 via connections 4. One or more of these connections 4 may be a wireless connection and/or a wire-based connection. The management device 3, on the other hand, is connected to or can connect to input modules 61, 62 of different customers, such as mobile phones or smartphones, in particular via text messaging services.

Figure 2:
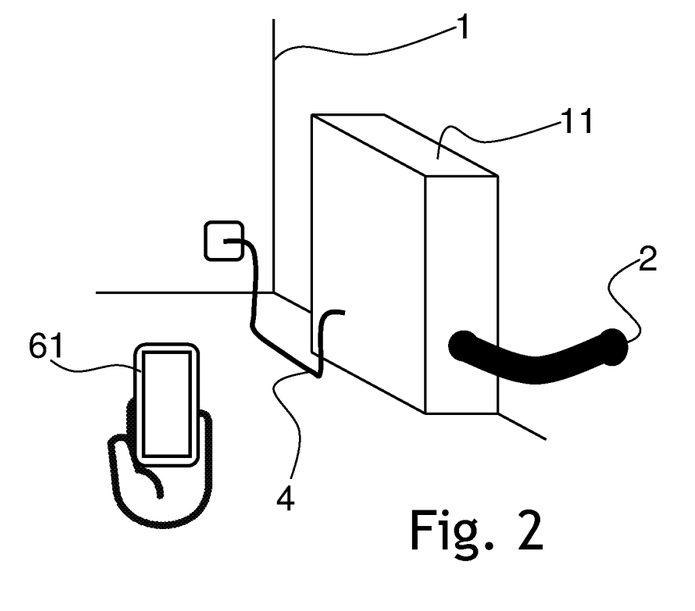
FIG. 2 is a schematic drawing of a battery system inside a building according to one advantageous embodiment.

The installations needed for the present system at a building 1 of a customer, are shown schematically in FIG. 2. The battery system 11 is located inside the building 1 and connected to the power grid 2 through a wall socket. Furthermore, an Ethernet connection 4 is shown leading away from the battery system 11, in order to connect it to the internet. FIG. 2 also schematically shows an input module 61 in the form of a smartphone help by a hand of the customer. As will be explained further below, the input module 61 will receive an inquiry from the management device on whether the customer is willing to relinquish control of the battery system to a certain extend or for a certain period of time to the management device 3 for a certain amount of monetary compensation. The customer will then input his or her response into the input module 61, and the response will be sent back to the management device 3 for further processing.

Figure 3:
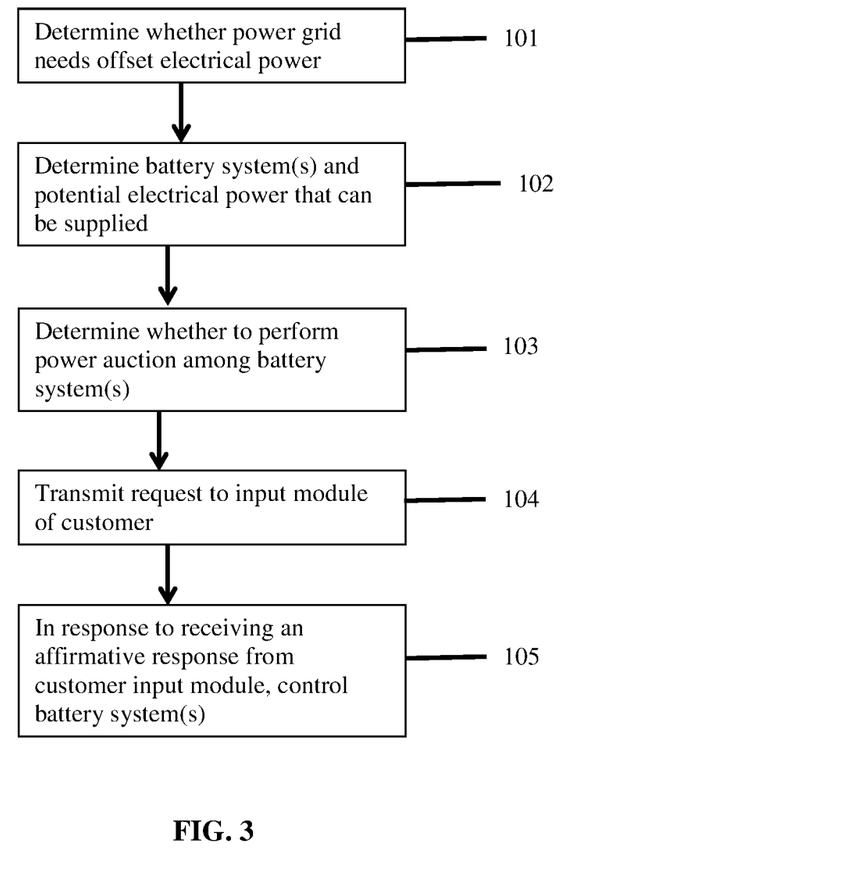
FIG. 3 is a flow chart of a remote battery management method according to one advantageous embodiment.

The flow chart in FIG. 3 represents a process or method performed by the remote battery management system according to a further aspect of the invention. In a first step 101, it is determined, that the power grid needs offset electrical power in order to uphold the necessary electrical parameters such as the voltage level and frequency. This offset electrical power may be positive, i.e. power is supplied to the grid, or negative, i.e. power is removed from the grid and stored. In a second step 102, it is determined how many battery systems are online, and the potentially suppliable electrical power and/or the maximum available capacity is measured or calculated.

In a third step 103, it is decided whether to perform an auction among the available battery systems. Alternatively, it may be decided that the necessary electrical power may be drawn from another power station, which may either be turned on or which power output level may be raised for this purpose. The decision on whether to perform an auction, may be made automatically by the management device upon taking a number of parameters into consideration, in particular a current energy market price, results achieved in previous auctions, the amount of electrical power demanded by the grid, etc. Alternatively, the management device may aid in making the decision on whether to start an auction by supplying and visualizing these parameters.

In a fourth step 104, an inquiry is sent to the input module of the customer indicating that there is a request for the customer's battery system to be utilized for backup power and the amount of monetary compensation the customer may receive for honoring that request. In the diagram in FIG. 3, it is assumed that the customer agrees and transmits an affirmative response back to the management system through his or her input module. Then, in a fifth step 105, the battery system is put into a standby mode and the power and/or capacity available from the battery system is stored in the memory of the management device. The management device then temporarily controls the battery system and utilizes it as a virtual power station. Alternatively to the standby mode, the battery system may be put into a reserved mode, or a certain fraction of its storage region or capacity region may be put into a reserved mode to prevent its utilization by other entities.

In the following, three different embodiments of the method will be described in more detail. The first example shows the necessary steps for immediate action, which may be performed when immediate action in the order of seconds is required, in order to offset an immediate power imbalance in the external power grid. The second example shows the necessary steps for fast action, which may be performed when the power levels vary in the order of minutes or hours. The third example shows the necessary steps for slow action, which may be performed when the variations in the power levels in the grid are in the order of one or more days.

FIRST EXAMPLE

Immediate Action

The process according to this first example is designed for responding to a current and urgent need of the power grid for electrical power, possibly in order to avoid an impending voltage breakdown. First, it is identified that the grid has a demand for electrical power or that there is excess power on the grid that needs to be withdrawn and stored. A software module is then utilized to obtain the number of battery systems that are currently online. Then, for each of these battery systems, it is determined how much power they have in store and can supply to the grid and/or how much free capacity they have left for excess power to be stored.

An adaptive system uses previous responses of customers from previous auctions to determine an expected overall electrical power that may be obtained from the battery systems that are online through an auction. The expected electrical power may in particular depend on the number of battery systems that are online, on the time of the day, on the day of the week, and/or on the season. This information may be supplied to the grid power provider, who can then decide whether to indeed start with the auction. Alternatively, the information is fed into an algorithm in order to make this decision automatically.

A further software module determines the maximum monetary compensation for a certain amount of electrical power or electrical energy to be offered to the customers. For determining the maximum compensation, the prices for alternative sources of power may be taken into account, such as the current price for power from a conventional or regenerative power plant. The management device may obtain such price information in real time through a news feed, in particular through the internet. If a lower price cannot be achieved by way of the auction, the provider might consider obtaining the power from a power plant.

Once the auction commences, for each customer having a battery system online, the power available from that battery system is taken as a basis for calculating an initial monetary compensation offer. This offer is sent to the input device of the customer. The compensation may, in the case the offer is accepted, be paid to a previously communicated bank account, or the customer may receive a credit on his or her electrical bill.

Data regarding the behavior of each customer may advantageously be monitored and stored or archived for later use, for example for use in preparation or during a future auction. Such data may include information on the circumstances under which the customer will respond in the affirmative. Such data may be collected in an anonymized fashion or in relation to each specific battery system. The data may be utilized in order to optimize the process of a future auction. In addition, after the auction has ended, additional information on the customer's behavior may be stored, such as whether the promised power or capacity of the battery system was indeed available at the time agreed upon or whether it fell short, for example due to a disruption of internet service. Such information may be utilized by the management device in future auctions in order to make a prediction on the amount of extra capacity or extra power that needs to be taken into the calculation in order to compensate for the expected missing amount. This will increase the chances that the demanded electrical power will be achieved in the future auction.

Once the customer has accepted the offer, i.e. the input module has sent an affirming response to the management device, his or her battery system is put into standby or reserved modus and the power or capacity available in the battery system will be determined by the management device and stored in its memory. The management device then utilizes the battery systems available to it together as a virtual or distributed power station. That means that it may increase or decrease the energy output of each battery system in order to achieve an overall change in the power supplied to the external grid, just as it would with a real power station, which is installed at a certain location.

SECOND EXAMPLE

Fast Action

The process according to this second example is designed for responding to a quick need of the power grid for electrical power. However, in contrast to the first example, the demand is not an immediate one, which has to be satisfied within seconds. Instead, the response may take place in the order of minutes or hours. As in the first example, it is first identified that the grid has a demand for electrical power or that there is excess power on the grid that needs to be withdrawn and stored. A software module is then utilized in order to obtain the number of battery systems that are currently online. Then, for each of these battery systems, it is determined how much power they have in store and can supply to the grid and/or how much free capacity they have left for excess power to be stored.

An adaptive system uses previous responses of customers from previous auctions to determine an expected overall electrical power that may be obtained from the battery systems that are online through an auction. The expected electrical power may in particular depend on the number of battery systems that are online, on the time of the day, on the day of the week, and/or on the season. This information may be supplied to the grid power provider, who can then decide whether to indeed start with the auction. Alternatively, the information is fed into an algorithm in order to make this decision automatically.

A further software module determines the maximum monetary compensation for a certain amount of electrical power or electrical energy to be offered to the customers. For determining the maximum compensation, the prices for alternative sources of power may be taken into account, such as the current price for power from a conventional or regenerative power plant. The management device may obtain such price information in real time through a news feed, in particular through the internet. If a lower price cannot be achieved by way of the auction, the provider might consider obtaining the power from a power plant.

Once the auction commences, for each customer having a battery system online, the power available from that battery system is taken as a basis for calculating an initial monetary compensation offer. This offer is sent to the input device of the customer. The compensation may, in the case the offer is accepted, be paid to a previously communicated bank account, or the customer may receive a credit on his or her electrical bill.

If there is no affirmative response within a predetermined amount of time, the management device may send another request to the input module of the consumer, possibly with an updated offer. The value of the proposed or offered compensation according to the updated offer may be higher than the previous one, in order to raise the incentive for the customer to accept the offer. In this way, multiple requests with increasing compensation offers may be sent, until either the customer accepts, or until the previously determined maximum monetary compensation has been reached.

Data regarding the behavior of each customer may advantageously be monitored and stored/archived for later use, for example for use in preparation or during a future auction. Such data may include information on the circumstances under which the customer will respond in the affirmative. Such data may be collected in an anonymized fashion or in relation to each specific battery system. The data may be utilized in order to optimize the process of a future auction. In addition, after the auction has ended, additional information on the customer's behavior may be stored, such as whether the promised power or capacity of the battery system was indeed available at the time agreed upon or whether it fell short, for example due to a disruption of internet service. Such information may be utilized by the management device in future auctions in order to make a prediction on the amount of extra capacity or extra power that needs to be taken into the calculation in order to compensate for the expected missing amount. This will increase the chances that the demanded electrical power will be achieved in the future auction.

Once the customer has accepted the offer, i.e. the input module has sent an affirming response to the management device, his or her battery system is put into standby or reserved modus and the power or capacity available in the battery system will be determined by the management device and stored in its memory. The management device then utilizes the battery systems available to it together as a virtual or distributed power station. That means that it may increase or decrease the energy output of each battery system in order to achieve an overall change in the power supplied to the external grid, just as it would with a real power station, which is installed at a certain location.

THIRD EXAMPLE

Slow Action

The process according to this second example is designed for responding to a future need of the power grid for electrical power. In particular, this may be an example for responding to future demands for power by the grid or by a load. Initially, it is identified that the grid will have a demand for electrical power at a determined time in the future, e.g. on the next day, or that there will be excess power on the grid will need to be withdrawn and stored. A software module is then utilized in order to obtain the number of battery systems that are currently online or that have been online in the past. Then, from these parameters, it is determined, through the use of an appropriate algorithm, how much power or capacity is expected to be available during the time the demand will arise.

An adaptive system uses previous responses of customers from previous auctions to determine an expected overall electrical power that may be obtained from the battery systems that are online through an auction. The expected electrical power may in particular depend on the number of battery systems that are online, on the time of the day, on the day of the week, and/or on the season. This information may be supplied to the grid power provider, who can then decide whether to indeed start with the auction. Alternatively, the information is fed into an algorithm in order to make this decision automatically.

A further software module determines the maximum monetary compensation for a certain amount of electrical power or electrical energy to be offered to the customers. For determining the maximum compensation, the prices for alternative sources of power may be taken into account, such as the current price for power from a conventional or regenerative power plant. The management device may obtain such price information in real time through a news feed, in particular through the internet. If a lower price cannot be achieved by way of the auction, the provider might consider obtaining the power from a power plant.

Once the auction commences, for each customer having a battery system, the power available from that battery system is taken as a basis for calculating an initial monetary compensation offer. This offer is sent to the input device of the customer along with information on the time the power is demanded and on the amount of power that is being requested from the customer. The compensation may, in the case the offer is accepted, be paid to a previously communicated bank account, or the customer may receive a credit on his or her electrical bill.

If there is no affirmative response within a predetermined amount of time, the management device may send another request to the input module of the consumer, possibly with an updated offer. The value of the proposed or offered compensation according to the updated offer may be higher than the previous one, in order to raise the incentive for the customer to accept the offer. In this way, multiple requests with increasing compensation offers may be sent, until either the customer accepts, or until the previously determined maximum monetary compensation has been reached.

Data regarding the behavior of each customer may advantageously be monitored and stored/archived for later use, for example for use in preparation or during a future auction. Such data may include information on the circumstances under which the customer will respond in the affirmative. Such data may be collected in an anonymized fashion or in relation to each specific battery system. The data may be utilized in order to optimize the process of a future auction. In addition, after the auction has ended, additional information on the customer's behavior may be stored, such as whether the promised power or capacity of the battery system was indeed available at the time agreed upon or whether it fell short, for example due to a disruption of internet service. Such information may be utilized by the management device in future auctions in order to make a prediction on the amount of extra capacity or extra power that needs to be taken into the calculation in order to compensate for the expected missing amount. This will increase the chances that the demanded electrical power will be achieved in the future auction.

Once the customer has accepted the offer, i.e. the input module has sent an affirming response to the management device, his or her battery system is put into standby or reserved modus. It will then be charged, if power will be demanded, or discharged, if free capacity will be demanded, in order put the battery system into an optimal state. Once the charge or discharge process has been completed, i.e. the battery system has been fully charged or discharged, it indicates this new state to the management device. The management device then utilizes the battery systems available to it together as a virtual or distributed power station at the determined time in the future.

REFERENCE NUMERALS 1 building
11 battery system
12 further battery system(s)
2 external power grid
3 management device
4 connection
51 load
52 further load
61 input module
62 further input module
101 first step
102 second step
103 third step
104 fourth step
105 fifth step

The invention claimed is:

1. A remote battery management system comprising:
at least one battery system installed at a building of a customer and connected to an external power grid, wherein the battery system is configured to store excess electrical power and to supply stored electrical power to said external power grid;
a management device connected to said at least one battery system via a connection, wherein said management device is configured to
identify a demand for electrical power of said external power grid or of a load connected to said external power grid,
transmit a request for customer permission to use electric power stored at the building of said customer, to an electronic input module of said customer,
receive a response to the request from said electronic input module, and
upon the response being a response permitting use, operating said at least one battery system to supply electrical power to said external power grid to meet said demand for electrical power.

2. The management system according to claim 1, wherein said battery system is configured to store excess electrical power supplied by a local power generator and/or through said external power grid.

3. The management system according to claim 2, wherein said management device is further configured to disregard said response permitting use after receiving said affirmative response from said further electronic input module and determining that said demand for electrical power has been met by operating said further battery system.

4. The management system according to claim 1, further comprising at least one further battery system connected to said external power grid, wherein said management device is further configured to
transmit a further request requesting electric power service to a further electronic input module, and
upon receiving an affirmative response from said further electronic input module to the further request, operating said further battery system to supply electrical power to said external power grid to meet said demand for electrical power, if operating said battery system to supply electrical power to said external power grid is not sufficient to meet said demand for electrical power.

5. The management system according to claim 1, wherein said management device is further configured to disregard said response permitting use after a lapse of a predetermined amount of time.

6. The management system according to claim 1, wherein said management device is further configured to transmit an updated inquiry requesting electric power service to said electronic input module of said customer.

7. The management system according to claim 1, wherein said management device is connected to said at least one battery system via a wire connection.

8. The management System according to claim 1, wherein said management device is connected to said at least one battery system via a wireless connection.

9. The management system according to claim 1, wherein said battery system is configured to store solar power from a solar panel installation.

10. The management system according to claim 9, wherein said management device is configured to identify said demand for electrical power by analyzing past delivery of electrical energy to the external power grid and past withdrawal of electrical energy from the external power grid.

11. The management system according to claim 9, wherein said management device is configured to identify said demand for electrical power by monitoring an electrical parameter at said external power grid or at said load.

12. The management system according to claim 11, wherein said electrical parameter is a voltage value, a change of a voltage value, a frequency value, or a change of a frequency value at said external power grid or at said load.

13. The management system according to claim 11, further comprising at least one sensor connected to said external power grid and/or to said load, which sensor monitors said electrical parameter and is connected to said management device.

14. The management system according to claim 1, wherein said management device is configured to identify a current and/or a future demand for electrical power of said external power grid or of a load connected to said external power grid.

15. The management system according to claim 1, wherein the request comprises a message indicating a request for the customer's battery system to be used for backup power and an amount of monetary compensation for the backup power for accepting the request.

16. The management system according to claim 1, wherein, upon the response being a response not permitting use, said at least one battery system is not operated to supply electrical power to said external power grid.

17. The management system according to claim 1, wherein the response is input by the customer to a user interface of the electronic input module.

18. A remote battery management method for managing a remote battery management system comprising at least one battery system installed at a building and electrically connected to an external power grid, wherein the battery system is configured to store excess electrical power and to supply stored electrical power to said external power grid, wherein the method comprises the following steps:
identifying a demand for electrical power of said external power grid or of a load connected to said external power grid,
transmitting a request for customer permission to use electric power stored at the building, to an electronic input module, receiving a response to the request from said electronic input module, and upon the response being a response permitting use, operating said at least one battery system to supply electrical power to said external power grid to meet said demand for electrical power.

19. The remote battery management method according to claim 18, wherein said system further comprises at least one further battery system connected to said external power grid, said method further comprising the following steps:

transmitting a further request requesting electric power service to a further electronic input module, and upon receiving an affirmative response from said further electronic input module to the further request, operating a further battery system to supply electrical power to said external power grid to meet said demand for electrical power, if operating said battery system to supply electrical power to said external power grid is not sufficient to meet said demand for electrical power.

20. The remote battery management method according to claim 18, wherein the request comprises a message indicating a request for the customer's battery system to be used for backup power and an amount of monetary compensation for the backup power for accepting the request.

21. A management device for a Remote Battery Management System comprising at least one battery system installed at a building and electrically connected to an external power grid, the at least one battery system storing excess electrical power and supplying the stored electrical power to said external power grid, the management device comprising at least one microprocessor configured to:

identify a demand for electrical power of said external power grid or of a load connected to said external power grid, transmit a request for customer permission to use electric power stored at the building, to an electronic input module, receive a response to the request from said electronic input module, and upon the response being a response permitting use, operate said at least one battery system to supply electrical power to said external power grid to meet said demand for electrical power.

22. The management device according to claim 21, wherein the request comprises a message indicating a request for the customer's battery system to be used for backup power and an amount of monetary compensation for the backup power for accepting the request.

* * * * *